US009601917B2

(12) United States Patent
An et al.

(10) Patent No.: US 9,601,917 B2
(45) Date of Patent: Mar. 21, 2017

(54) SHORT CIRCUIT PREVENTION DEVICE

(71) Applicants: Chun Hun An, Chungcheongnam-Do (KR); Dae Hoon Park, Daegu (KR)

(72) Inventors: Chun Hun An, Chungcheongnam-Do (KR); Dae Hoon Park, Daegu (KR)

( * ) Notice: Subject to any disclaimer, the term of this patent is extended or adjusted under 35 U.S.C. 154(b) by 270 days.

(21) Appl. No.: 14/412,813

(22) PCT Filed: Dec. 17, 2012

(86) PCT No.: PCT/KR2012/011003
§ 371 (c)(1),
(2) Date: Jan. 5, 2015

(87) PCT Pub. No.: WO2014/014173
PCT Pub. Date: Jan. 23, 2014

(65) Prior Publication Data
US 2015/0194804 A1 Jul. 9, 2015

(30) Foreign Application Priority Data
Jul. 20, 2012 (KR) .................. 10-2012-0079110

(51) Int. Cl.
*H02H 5/08* (2006.01)
*H01R 9/24* (2006.01)
(Continued)

(52) U.S. Cl.
CPC .......... *H02H 5/083* (2013.01); *H01R 9/2483* (2013.01); *H02H 11/002* (2013.01); *H01R 13/523* (2013.01)

(58) Field of Classification Search
CPC ........ H02H 5/08; H02H 5/083; H02H 11/002; H01R 9/24; H01R 9/2483; H01R 13/523
(Continued)

(56) References Cited

U.S. PATENT DOCUMENTS 4,933,804 A * 6/1990 Bertenshaw .......... H01L 23/642
361/111
5,642,248 A * 6/1997 Campolo ........... H01R 13/7135
361/115
(Continued)

FOREIGN PATENT DOCUMENTS

KR 20-0339079 1/2004
KR 10-2005-0037986 11/2006
(Continued)

OTHER PUBLICATIONS

English Abstract of KR 10-0731051.
(Continued)

*Primary Examiner* — Rexford Barnie
*Assistant Examiner* — Terrence Willoughby
(74) *Attorney, Agent, or Firm* — Preston Smirman; Smirman IP Law, PLLC

(57) ABSTRACT

Disclosed is a device capable of preventing a short circuit even in the event of flooding. A terminal polarity fixing unit is disposed between an input terminal unit and an output terminal unit such that a first output terminal and a second output terminal are electrically connected to a neutral terminal and to a phase voltage terminal, respectively, all the time, regardless of how first and second input terminals are paired with the phase voltage terminal and the neutral terminal of an alternating-current outlet. First and second connecting terminals are electrically insulated from each other and spaced apart from each other while being exposed to one side of a body unit of a connecting terminal block made from an insulating body, and electrically connect the first and second output terminals to a load. A short circuit prevention conductor is connected to the first connecting terminal, which is in turn connected to the neutral terminal but is not connected to the second connecting terminal, and is arranged in the vicinity of the second connecting terminal (Continued)

so as to surround at least a portion of the side of the connecting terminal block, at least a portion of the upper portion of the connecting terminal block, and at least a portion of each of the side and upper parts of the connecting terminal block. When the connecting terminal block is flooded, the electric current flowing out of the second connecting terminal flows into the short circuit prevention conductor via the water, and an electric current sufficient for causing an electric shock does not flow to other sites.

16 Claims, 7 Drawing Sheets

(51) Int. Cl.
*H02H 11/00* (2006.01)
*H01R 13/523* (2006.01)

(58) Field of Classification Search
USPC .................................... 307/326; 361/42–50
See application file for complete search history.

(56) References Cited

U.S. PATENT DOCUMENTS

| 2006/0198067 A1* | 9/2006 | Pearse | H02H 3/16 361/42 |
| 2010/0020452 A1* | 1/2010 | Gandolfi | H02H 3/16 361/42 |
| 2012/0188667 A1* | 7/2012 | Padro | H01H 83/02 361/42 |

FOREIGN PATENT DOCUMENTS

| KR | 10-0731051 | 6/2007 |
| KR | 20-2009-0003192 | 4/2009 |

OTHER PUBLICATIONS

English Abstract of KR 20-2009-0003192.
English Abstract of KR 20-0339079.
English Abstract of KR 10-2005-0037986.

* cited by examiner

SHORT CIRCUIT PREVENTION DEVICE

CROSS-REFERENCE TO RELATED APPLICATION

The instant application is a national phase of PCT International Application No. PCT/KR2012/011003 filed on Dec. 17, 2012, and claims priority to Korean Patent Application Serial No. 10-2012-0079110, filed Jul. 20, 2012, the entire specifications of both of which are expressly incorporated herein by reference.

TECHNICAL FIELD

The invention relates to a short circuit or electrical leakage prevention device for preventing electric shock by decreasing short circuit current between exposed terminals of electrical devices that is flooded and for allowing a normal operation of the electrical devices.

BACKGROUND ART

The Korean Patent Application Publication 10-2005-0037986 (referred as 'the prior art') discloses an electrical leakage preventing device for preventing an electrical leakage or an electrical shock by absorbing the leak current from bared charged portion when an electrical equipment or device is flooded while flowing electric current there through. A couple of embodiments of such electrical leakage preventing devices were shown, and the common feature was that they were installed with a planar metal plate having an area large enough to cover all of other devices such as a circuit breaker and a ballast including a terminal block in which the bared connection terminals (a single phase connection terminal P, a neutral point terminal N, an earth terminal E) are disposed, wherein the planar metal plate is placed under the terminal block, the circuit breaker, the stabilizer, etc. while being connected electrically to the neutral point terminal (N) or the earth terminal (E). According to the prior art, by such structure, even though the bared connection terminals of the terminal block get flooded, almost all of the current from the bared connection terminals flows into the planar metal plate, such that even though a human body is touched with or dipped the into the water in which the terminal block exists, magnitude of the current flowing through the human body is so feeble that the electrical shock or leakage can be prevented.

DETAILED DESCRIPTION OF INVENTION

Technical Problem

However, according to the inventor who made and tested an electrical leakage preventing device having the same structure as the prior art, the prior art has been found to have a couple of critical disadvantages.

First, in order to obtain the effects of preventing the electrical leakage and shock an electrical leakage preventing metal plate should be connected to the neutral point terminal of the alternating current (AC) power source, but it is a key issue to guarantee it perfectly. According to the description of the prior art, in order to obtain the effects of preventing the electrical leakage when flooded, a planar metal plate should be connected to the neutral point terminal (N) or the earth terminal (E). A method for doing it is to find out a first power supply line connected to the neutral point of the power source out of two power lines for supplying a single phase AC power source, to connect the first power supply line to the connection terminal to which the planar metal plate is connected, and to connect the remaining second power supply line to the remaining connection terminal when installing the terminal block. However, this method has problems that it is troublesome to find out the first power supply line connected to the neutral point terminal of the power supply, the effects of preventing the electrical shock and leakage cannot be obtained if found and connected the wrong line, and since the load is applied all the time to the power source even when there is no need to supply the power it wastes the electrical power. In order to connect the load to the power source only when necessary, it may be considered to dispose a plug and an electrical outlet between the power source and the terminal block. In such a case, the connection path of the planar metal plate to the AC power source is the terminals in the terminal block→the plug terminals→the electrical outlet. In order to connect the planar metal plate to the neutral point terminal of the AC power source, it should be guaranteed completely to connect the plug terminal connected to the first connection terminal (J1) of the terminal block to which the planar metal plate is connected to the electrical outlet terminal connected to the neutral point terminal of the AC power source. The plug includes two plug terminals (IN1, IN2) and one earth terminal (G) connected electrically to the three terminals of the terminal block respectively. The two plug terminals (IN1, IN2) look alike. Two electrical outlet terminals applied with the AC power source, that is, the first outlet terminal (N) connected to the neutral point terminal of the AC power source and the second outlet terminal (R) connected to the single phase voltage terminal also look alike. Thus in order to make the first plug terminal (IN1) connected the first outlet terminal (N) for sure when a user put the plug in the electrical outlet, the user must know which of the two plug terminals is the first plug terminal (IN1), and at the same time which of the two outlet terminals is the first outlet terminal (N). In fact, it is very difficult to guarantee such conditions. Even though he or she knows the polarity of the plug and the outlet, unless the user is cautious in plugging, it is quite probable to make a mistake of changing the polarity. In order to prevent user's mistake, it may be a way to denote the polarities on the plug terminals and the outlet terminals, but an uninformed user may plug, and considering the possibility of mistakes due to inattention, that may not be perfect.

Also, the prior art describes as if the same effects would be obtained with the metal plate for preventing leakage connected to the 'earth terminal (E)', but according to the experiment by the inventor of this application the leakage and shock preventing effects could not be obtained with the metal plate for preventing leakage connected to the 'earth terminal (E)', not the 'neutral point terminal (N)'.

Second, the conductive metal plate suggested by the prior art for preventing leakage cannot provide the alleged functions of preventing leakage and shock when flooded as the prior art claimed. According to various tests by the inventor of this application, the problems were in the fact that the conductive metal plate for preventing leakage has a 'planar' structure. According to an experiment of the inventor, with the structure of disposing a large planar metal plate under the terminal block, etc. as suggested in the prior art, in a few or several tens of seconds after the terminal block was flooded the amount of the leakage current got larger, the leakage breaker operated, the power supply was disconnected. In addition, before the leakage breaker operated, the inventor had an electrical shock in the hand when put his hand into the flooded water. The reason is guessed that since the distance between the conductive metal plate for preventing leakage and the second terminal connected to the single phase voltage terminal is too large and the body of the terminal block made of insulator is disposed there between so as to interfere the current to flow through the shortest path, the resistance between them is large and therefore a part of the current from the second terminal flows into the conductive metal plate for preventing leakage, but the remaining current of considerable amount is leaked elsewhere in the water. The prior art suggested that the size of the planar metal plate for preventing leakage is 50×30 cm when the operating voltage is 380 [V]. However, according to the experiment of the inventor, if the conductive metal plate of a larger size (for example, 60×60 cm) is used, the time to the fall of the leakage breaker got a little bit longer, but eventually the leakage breaker operated. The problem could not be solved by increasing the size of the conductive plate. In fact, the size of the conductive plate could not be enlarged without limit due to the restriction to space where the conductive plate is installed. The problem was not a problem that could be thoroughly solved by enlarging the size of the planar conductive plate.

As such the above prior art could not provide the alleged effects of preventing electrical leakage and shock due to the above problems.

The invention is to solve such problems. It is an objective of the present invention to provide a leakage-preventing device which can perfectly guarantee prevention of electrical leakage and shock and normal power supply to the load when the terminal block is flooded through structural improvement of the conductive body for preventing leakage connected to the terminal block. It is another objective of the present invention to provide a leakage-preventing device that can connect the load to the AC power supply only when necessary by disposing the plug and the electrical outlet between the terminal block to which the load is connected and the AC power source, and that can rule out malfunction by user's ignorance or mistakes by guaranteeing that when the plug is put into the electrical outlet the conductive metal plate for preventing leakage current in flooding be connected to the neutral point terminal of the AC power source all the time.

Technical Solution

According to the present invention for accomplishing the above objectives, the present invention provides an electrical leakage prevention device in flooding comprising: an input terminal portion including a first input terminal (IN1), a second input terminal (IN2), and an earth terminal (G); an output terminal portion including a first output terminal (OUT1) and a second output terminal (OUT2); a terminal polarity (a terminal phase) fixing portion disposed between the input terminal portion and the output terminal portion, wherein, in connecting the first and second input terminals (IN1, IN2) to a phase voltage terminal (R) and a neutral point terminal (N) of an electrical outlet for an AC power source, irrespective of cases that (i) the first input terminal (IN1) and the phase voltage terminal (R) are connected to each other, and at the same time the second input terminal (IN2) and the neutral point terminal (N) are connected to each other, or (ii) on the contrary the first input terminal (IN1) and the neutral point terminal (N) are connected to each other, and at the same time the second input terminal (IN2) and the phase voltage terminal (R) are connected to each other, the terminal polarity fixing portion always makes electrical connections that the first output terminal (OUT1) is connected electrically to the neutral point terminal (N) and at the same time the second output terminal (OUT1) is connected electrically to the phase voltage terminal (R); a terminal block including a body portion made of insulator and a first connection terminal (J1) and a second connection terminal (J2), exposed on the body portion and disposed with an interval to be electrically insulated with each other, and for electrically connecting the first output terminal (OUT1) and the second output terminal (OUT2) to a load respectively; and a leakage-preventing conductor connected electrically to the first connection terminal (J1) connected electrically to the neutral point terminal (N) but disconnected electrically to the second connection terminal (J2) connected electrically to the phase voltage terminal (R), and disposed around the second connection terminal (J2) so as to enclose at least one of at least a portion of a side of the terminal block, at least a portion of a top of the terminal block, and at least a portion of each of the side and the top of the terminal block respectively, wherein, by the leakage-preventing conductor, when the terminal block is flooded, most of current from the second connection terminal (J2) flows through water and into the leakage-preventing conductor, and thus any current large enough to cause an electrical shock does not flow through other portions in water, which prevents electrical leakage and shock.

The terminal polarity fixing portion may comprise: a switching controlling portion for outputting a first control signal (exciting signal) while the first input terminal (IN1) and the second input terminal (IN2) are connected to the phase voltage terminal (R) and the neutral point terminal (N) of the electrical outlet for the AC power source respectively, and outputting a second control signal (non-exciting signal) while the first input terminal (IN1) and the second input terminal (IN2) are connected to the neutral point terminal (N) and the phase voltage terminal (R) of the electrical outlet for the AC power source respectively; and a switching portion for switching such that, if the second control signal (non-exciting signal) is inputted, the first output terminal (OUT1) and the first input terminal (Ni) are connected to each other and at the same time the second output terminal (OUT2) and the second input terminal (IN2) are connected to each other, while if the first control signal (exciting signal) is inputted, the first output terminal (OUT1) and the second input terminal (IN2) are connected to each other and at the same time the second output terminal (OUT2) and the first input terminal (IN1) are connected to each other. The switching portion may comprise: a relay coil configured to be in an excited state when a current flows there through and in a non-excited state when no current flows; and a relay switching terminal configured to switch so as to connect, in the non-excited state, the first output terminal (OUT1) to the first input terminal (IN1) and at the same time the second output terminal (OUT2) to the second input terminal (IN2), and in the excited state, the first output terminal (OUT1) to the second input terminal (IN2) and at the same time the second output terminal (OUT2) to the first input terminal (IN1). In such a case, the switching controlling portion comprises a relay controlling portion that makes the excited state by making a current flow through the relay coil while the first input terminal (IN1) and the second input terminal (IN2) are connected to the phase voltage terminal (R) and the neutral point terminal (N) of the electrical outlet for AC power source, and makes the non-excited state by making no current flow through the relay coil while the first input terminal (IN1) and the second input terminal (IN2) are connected to the neutral point terminal (N) and the phase voltage terminal (R), respectively.

Preferably, the terminal polarity fixing portion further comprises an SMPS for converting an AC voltage inputted through the first input terminal (IN1) and the second input terminal (IN2) to a DC voltage needed for an operation of the switching controlling portion.

The leakage-preventing conductor may comprise: a vertical conducting portion penetrating the body portion downward from the first connection terminal (J1); a floor conducting portion which is bent horizontally at an end of the vertical conducting portion, crosses a bottom of the body portion, and extends to an outside of the bottom; and a side conducting portion which is bent upward at an end of the floor conducting portion, faces a side surface of the body portion, and extends to a height that is not lower than a top surface of the terminal block. Preferably, the height of the side conducting portion may be higher than a height of the terminal block by at least 5 mm.

The leakage-preventing conductor may further comprises a top conducting portion which is bent toward a top surface of the terminal block at a top end of the side conducting portion and covers at least a portion of the top surface of the terminal block.

Preferably, the input terminal portion may be formed as a plug type which can be inserted into the electrical outlet for the AC power source to be supplied with an AC power only when necessary.

The leakage-preventing conductor may have (i) a structure of container that receives the terminal block inside and encloses side surfaces completely, or (ii) a structure of a closed ring that encloses the second connection terminal (J2) and circumnavigates around the terminal block.

Also, the leakage-preventing conductor may comprise a top vertical conducting portion which is bent at the first connection terminal (J1) and extended upward over a top of the body portion. Furthermore, the leakage-preventing conductor may further comprise a top horizontal conducting portion which is bent at a top end of the top vertical conducting portion and extended to cover the second connection terminal (J2).

Preferably, the leakage-preventing conductor may have a vertical cross-sectional area equal to or larger than 10 mm$^2$ with respect to a direction of current flow. If the leakage-preventing conductor is formed with a rectangular conductive plate, the width of the conductive plate is preferably not smaller than the width of the terminal block.

The leakage-preventing conductor may include at least two portions out of a first portion disposed under the second connection terminal (J2), a second portion disposed at a side of J2, and a third portion disposed on a top of J2, and preferably at least one out of the at least two portions may be located within 15 mm and the other portion(s) may be located within 30 mm, respectively, from the second connection terminal (J2).

The leakage-preventing conductor may include a planar conductor portion formed with a plurality of through-holes, which is located by a side of or over a top of the terminal block.

Advantageous Effects

According to the electrical leakage prevention device in flood of the present invention, a user does not have to worry about the direction (that is, connection polarity of terminals) that he or she puts a plug into an electrical outlet. Irrespective of the two insertion directions of the plug, the leakage-preventing conductor is always connected properly so as to obtain the effects of preventing electrical leakage and shock (that is, the leakage-preventing conductor is connected to a neutral point terminal).

Also, since the current flows through an almost straight line path between the connection terminal and the leakage-preventing conductor via water and leaks almost nowhere else even when the exposed connection terminals are flooded, and therefore there is almost no leaking current through water, the electrical shock does not take place in the human body touching or immersing in the water touching the human body. Furthermore, since there is no leaking current, the leakage breaker does not operate and a normal power supply to the load is maintained. That is, the malfunction of an electrical device connected to a power source via the electrical leakage prevention device due to flooding does not occur.

MODE FOR INVENTION

Below, embodiments of the invention are going to be described in detail referring to the figures.

Figure 1:
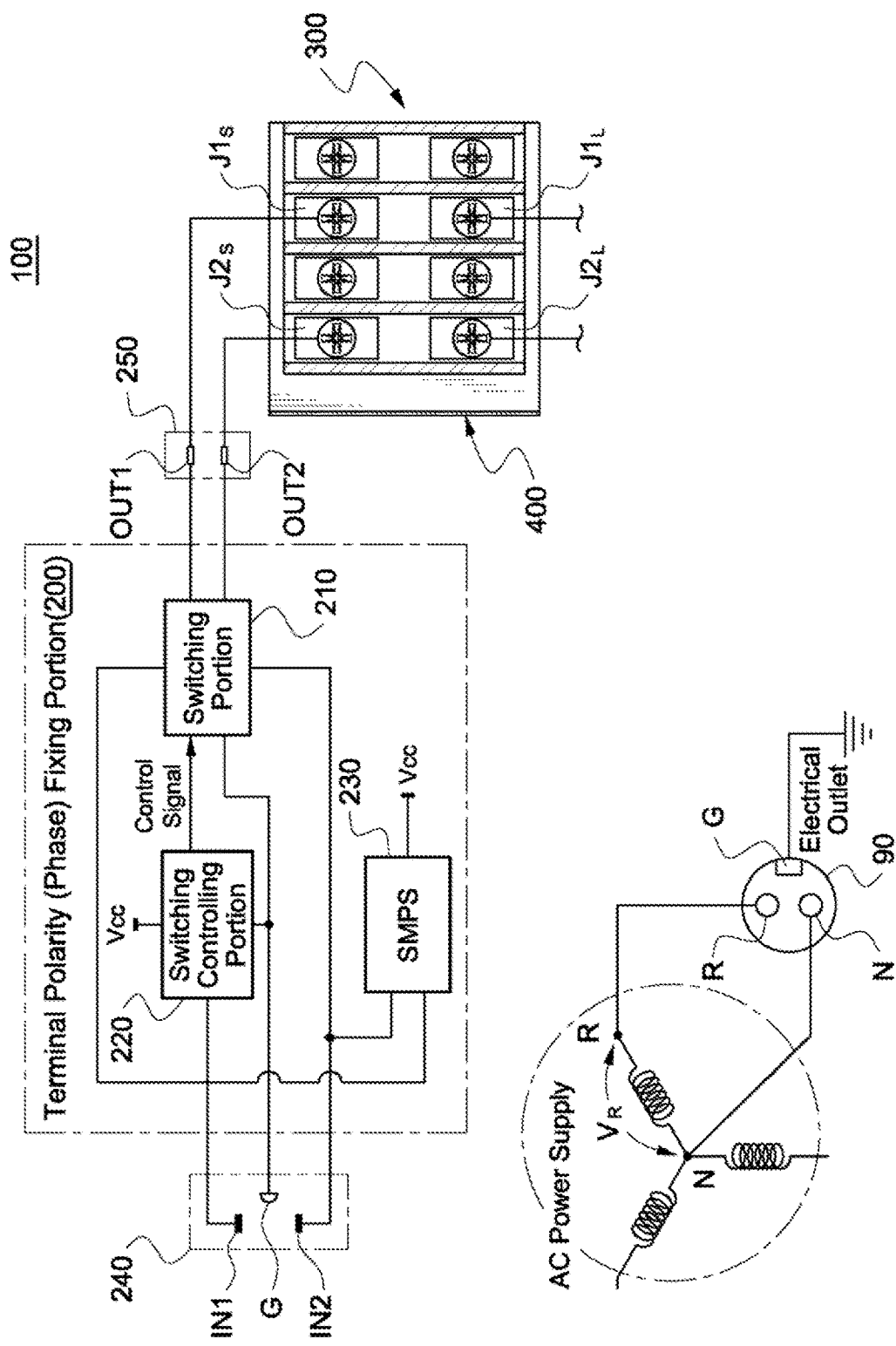
FIG. 1 is a block diagram showing an overall structure of a leakage-preventing device according to the invention.

As shown in FIG. 1, an electrical leakage-preventing device (100) according to the invention includes an input terminal portion (240), an output terminal portion (250), a terminal polarity (in other word, a terminal phase) fixing portion (200) disposed between them, a terminal block (300), and a leakage-preventing conductor (400). The electrical leakage-preventing device (100) provides functions that even though the terminal block (300) is flooded the leakage current does not flow outside, but flows only between a connection terminal of the terminal block (300) and the leakage-preventing conductor (400), preventing the electrical leakage and shock even when a part of human body touches the flooded water.

The input terminal portion (240) includes a first input terminal (Ni), and second input terminal (IN2), and an earth terminal (G). This input terminal portion (240) may be formed in a type of a plug that can be plugged in or out to an AC outlet (90) whenever necessary. The output terminal portion (250) includes a first output terminal (OUT1) and a second output terminal (OUT2). This output terminal portion (250) is connected to connection terminals (J1, J2) of the terminal block (300) through wires.

The terminal polarity fixing portion (200) is disposed between the input terminal portion (240) and the output terminal portion (250), and makes it sure that in connecting the first and second input terminals (IN1, IN2) to a phase voltage terminal (R) and a neutral point terminal (N) of the AC outlet (90), the first output terminal (OUT1) is connected to the neutral point terminal (N) of the AC outlet (90) electrically and at the same time the second output terminal (OUT2) is connected to the phase voltage terminal (R) of the AC outlet (90) electrically, irrespective of connecting as IN1-R and IN2-N or reversely (that is, IN2-R and IN1-N). In order to provide such functions, the terminal polarity fixing portion (200) includes at least a switching portion (210) and a switching controlling portion (220). Here, the AC outlet (90) includes the phase voltage terminal (R) and neutral point terminal (N) that are connected to the phase voltage portion and the neutral point terminal of the AC power source respectively and an earth terminal (G) that is earthed.

The switching controlling portion (220) outputs a first control signal (excitation signal) while the first input terminal (IN1) and the second input terminal (IN2) are connected to the phase voltage terminal (R) and the neutral point terminal (N) of the AC outlet (90) respectively, and outputs a second control signal (non-excitation signal) while the first input terminal (IN1) and the second input terminal (IN2) are connected to the neutral point terminal (N) and the phase voltage terminal (R) of the AC outlet (90) respectively. The switching portion (210), if the second control signal (non-excitation signal) is inputted from the switching controlling portion (220), makes the first output terminal (OUT1) and the first input terminal (IN1) connected to each other, and at the same time makes the second output terminal (OUT2) and the second input terminal (IN2) connected to each other. On the contrary, if the first control signal (excitation signal) is inputted from the switching controlling portion (220), the switching portion (210) performs switching so as to make the first output terminal (OUT1) and the second input terminal (IN2) connected to each other, and at the same time to make the second output terminal (OUT2) and the first input terminal (IN1) connected to each other.

Figure 2:
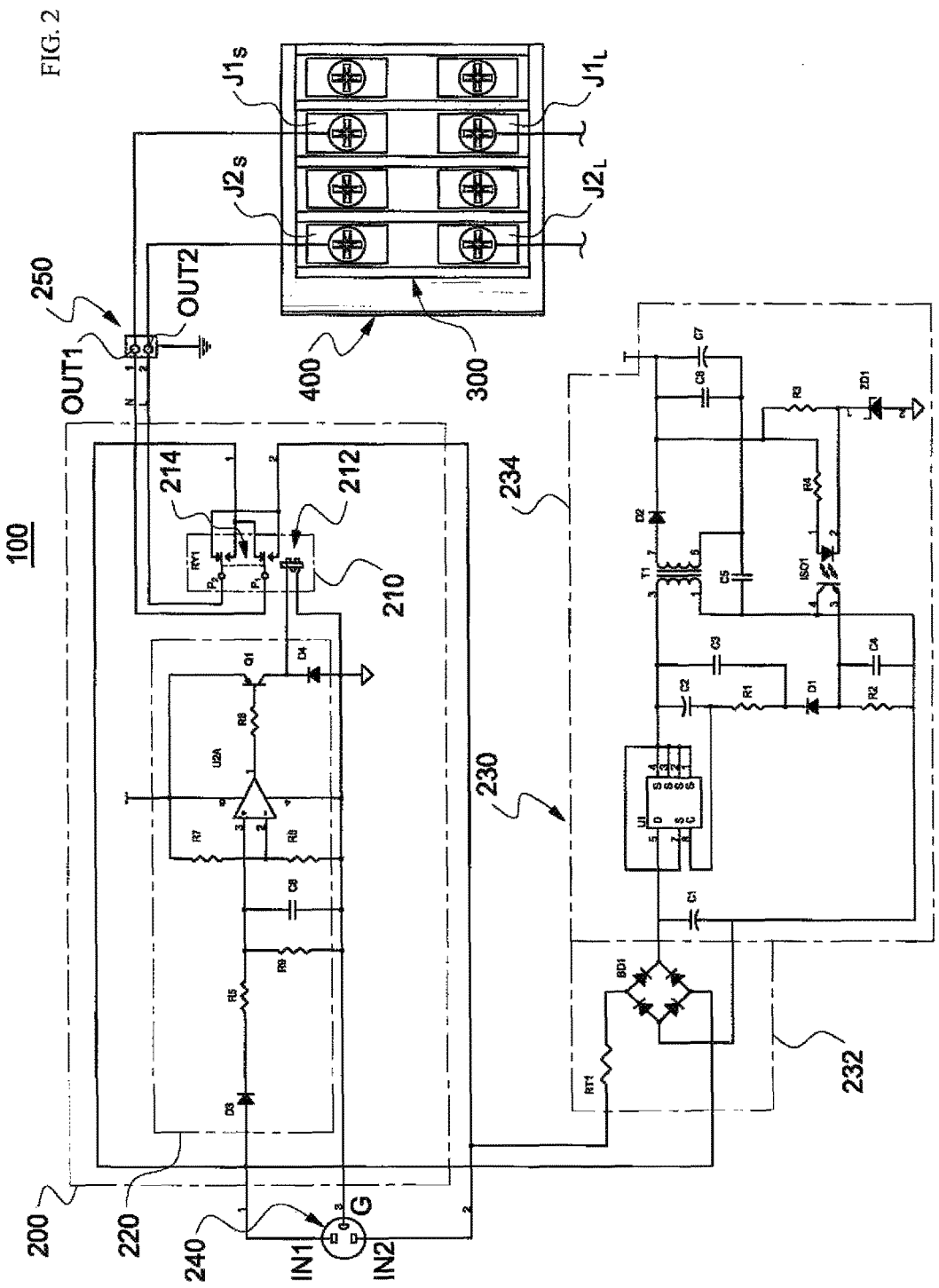
FIG. 2 is a circuit diagram showing an example of an electrical circuit of a terminal polarity fixing portion of FIG. 1.

The switching portion (210) can be configured with a relay (RY1), for an example, as shown in FIG. 2. The relay (RY1) includes a relay coil (212) which becomes of an excitation state when current flows through itself and of a non-excitation state when current does not flow through itself, and a relay switching terminal (214) which performs switching so as to connect the first output terminal (OUT1) to the first input terminal (IN1) and at the same time the second output terminal (OUT2) to the second input terminal (IN2) in the non-excitation state, and to connect the first output terminal (OUT1) to the second input terminal (IN2) and at the same time the second output terminal (OUT2) to the first input terminal (IN1) in the excitation state. In this case, the switching controlling portion (220) comprises a relay controlling circuit for controlling the relay (RY1). That is, the switching controlling portion (220) is configured to make current flow through the relay coil (212) so as to be of the excitation state while the first input terminal (IN1) and the second input terminal (IN2) are connected to the phase voltage terminal (R) and the neutral point terminal (N) of the AC outlet (90) respectively, and to make no current flow through the relay coil (212) so as to be of the non-excitation state while the first input terminal (IN1) and the second input terminal (IN2) are connected to the neutral point terminal (N) and the phase voltage terminal (R) of the AC outlet (90) respectively.

According to FIG. 2, the relay controlling circuit denoted as 220 includes a voltage comparing circuit (D3, R5, R9, C8, R6, R7, OP-amp (U2A)) for comparing a voltage at the first input terminal (IN1) and a voltage at the earth terminal and outputting a logic-high voltage to an output end only while the voltage at the first input terminal (IN1) is higher than the voltage at the earth terminal and outputting a logic-low voltage otherwise, and a switching circuit (R8, Q1, D4) for being switched on to be conductive itself and makes current flow through the relay coil only when the logic-high voltage is outputted to the output end of the OP-amp (U2A).

The terminal polarity fixing portion (200) may further comprise a SMPS portion (230) for converting an AC voltage inputted through the first input terminal (IN1) and the second input terminal (IN2) to a DC voltage needed for the operation of the switching controlling portion (220). This SMPS portion (230), as shown in FIG. 2 for an example, includes a rectifying circuit (232) which is connected to the phase voltage terminal (R) and the neutral point terminal (N) of the AC outlet (90), receives AC voltage, and converts to DC voltage through a full-wave rectification, and a SMPS circuit (234) which receives the output DC voltage from the rectifying circuit (232) and converts to a voltage ($V_{cc}$) needed for the operation of the OP-amp (U2A) of the switching controlling portion (220). This SMPS circuit (234) may be adopted from a conventionally well-known SMPS circuit, and therefore it is not suggested newly, the further description of which is omitted.

The output terminals (OUT1, OUT2) are connected to a load (not shown) through the terminal block (300). The terminal block (300) includes a body portion (310) made of insulator, and a first connection terminal (J1(S, L)) and a second connection terminal (J2(S, L)) which are exposed on a top surface of the body portion (310), separated from each other so as to be insulated electrically from each other, and for connecting the first output terminal (OUT1) and the second output terminal (OUT2) to the load (not shown). That is, to the first connection terminals J1(S) and J1(L) are connected electrically the first output terminal (OUT1) and a first input end (not shown) of the load, and to the second connection terminals J2(S) and J2(L) are connected electrically the second output terminal (OUT2) and a second input end (not shown) of the load.

Next, the leakage-preventing conductor (400) is not connected electrically to the second connection terminal (J2) that is electrically connected to the phase voltage terminal (R) (that is, a terminal which the electrical energy is hooked to) of the AC outlet (90), but electrically connected to the first connection terminal (J1) that is electrically connected to the neutral point terminal (N) of the AC outlet (90). The height of the leakage-preventing conductor (400), if it is disposed at a side of the terminal block (300), must not be lower than a height of a top surface of the terminal block (300). It is preferable that at least the leakage-preventing conductor (400) is disposed around the second connection terminal (J2) so as to be able to view at least a part thereof from the second connection terminal (J2). By disposing as such, when the connection terminals (J1, J2) are flooded, most of the leakage current flowing from the J2 connected to the phase voltage terminal (R) is made to flow into the J1 connected to the neutral point terminal (N) through water, and therefore if deviated slightly from the straight line between the second connection terminal (J2) and the leakage-preventing conductor (400), there is almost no leakage current, and no electrical shock occurs there. Also, since the water between the second connection terminal (J2) and the leakage-preventing conductor (400) provides an appropriate value of resistance, the load (not shown) connected to the first and second connection terminals (J1, J2) has a parallel connection with the water (resistor), such that the load also can keep working normally.

The prior arts mentioned before did not know that even though the connection terminals (J1, J2) are flooded, if disposing the leakage-preventing conductor (400) as such with respect to the second connection terminal (J2), the leakage current can be prevented to leak outside, preventing electrical shock and guaranteeing a normal operation of the load. The prior art suggested a 'planar' conductive plate for a leakage-preventing conductor. However, the planar conductive plate cannot be seen from a connection terminal connected to a (single) phase voltage terminal. Since a terminal block body that is made of insulator is disposed between them and interfere the current's flowing through the shortest path between them, the resistance between them becomes large. As a result, a portion of the leakage current from the connection terminal connected to the (single) phase voltage terminal flows into the leakage-preventing conductor, but a considerable amount of the current leaks through parts other than the planar conductive plate. According to the experiments by the inventor, since the amount of the current leaks through parts other than the planar conductive plate is so large that the leakage breaker is operated, in a few or tens of seconds after the connection terminals were flooded, the leakage breaker gets operated and the power supply to the load is disconnected. Of course, if putting a hand into the flooded water before the leakage breaker operates, surely the phenomenon of electrical shock is there. As mentioned above, the prior art suggested that the size of the planar conductive plate for preventing leakage is 50×30 cm for the operating voltage of 380 [V], but according to tests by the inventor even the conductive plate of much larger size than that could not stop the operation of the leakage breaker.

The inventor performed many real tests by varying the shape, location of installation, disposition with respect to the connection terminals (J1, J2) of the leakage-preventing conductor in order to solve the problems of the prior art. As a result of tests, as mentioned in the above, if the leakage-preventing conductor (400) is disposed in parallel to a floor of the terminal block (300) installed with the second connection terminal (J2), the electrical leakage and associated electrical shock could not be prevented.

The leakage-preventing conductor (400) is preferably made using metal of excellent conductivity, for example, copper or copper alloy, or aluminum or aluminum alloy, etc.

A satisfying result of preventing electrical leakage and shock has been obtained when the leakage-preventing conductor (400) is disposed so as to enclose the connection terminals (J1, J2) from sideways and/or above, as enclosing at least a portion of the side of the terminal block (300) on a top surface of which the connection terminals (J1, J2) are disposed, or as enclosing at least a portion of the top of the terminal block (300), or as enclosing at least a portion of the top and the side of the terminal block (300). In a case that the leakage-preventing conductor (400) is disposed as enclosing a portion of the side of the terminal block (300), in order to obtain sure effects of preventing electrical leakage and shock, it is preferable at least a portion of the leakage-preventing conductor (400) can be seen from the second connection terminal (J2) connected to the phase voltage terminal of the AC power source. The larger area the leakage-preventing conductor (400) encloses the second connection terminal (J2) with, the more excellent effects of preventing electrical leakage and shock are obtained. There may be various ways to realize the leakage-preventing conductor (400) so as to satisfy these requirements. Some representative ones are shown in FIGS. 3 through 7.

Figure 3:
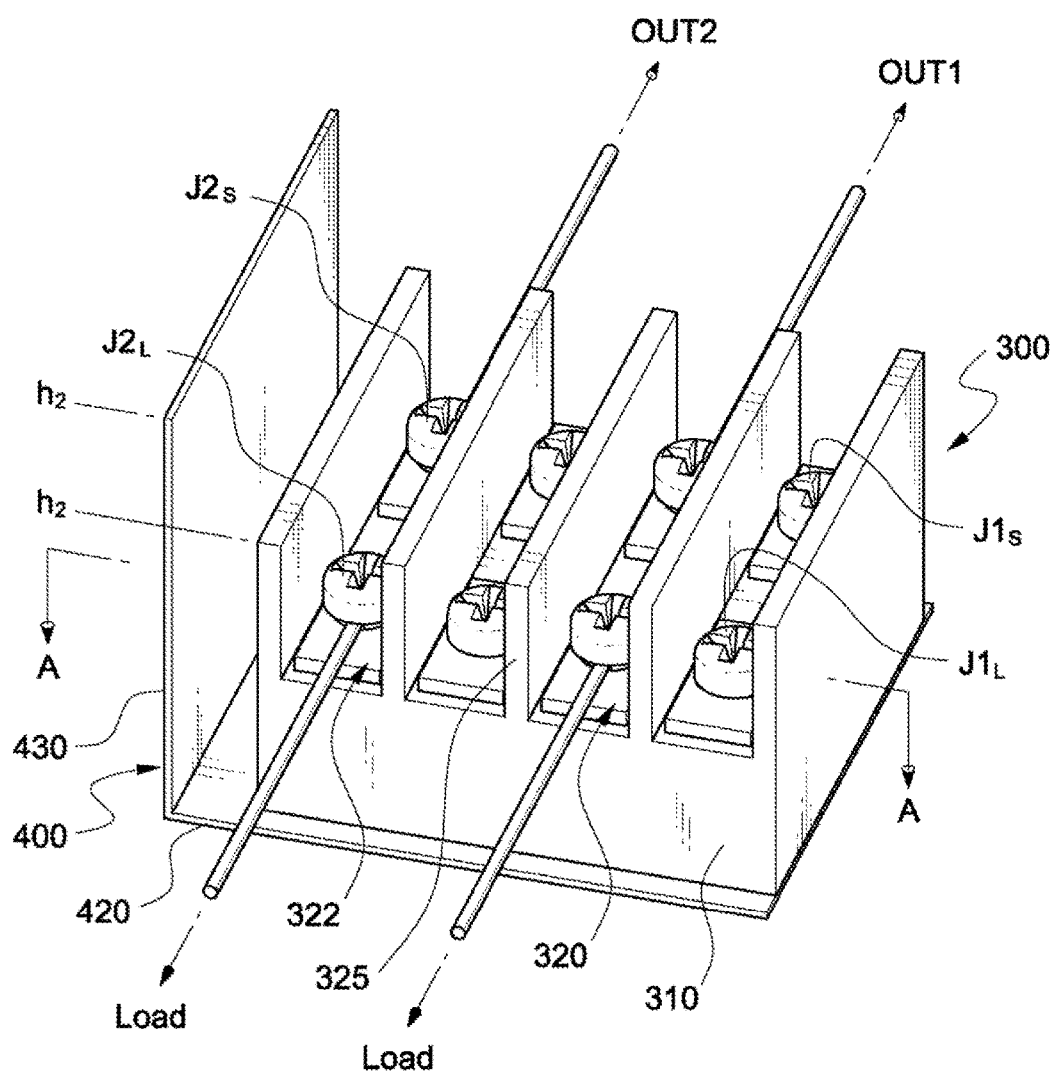
FIG. 3 is a diagram showing a disposition of a terminal block and a leakage-preventing conductor according to an embodiment of the invention.
Figure 4:
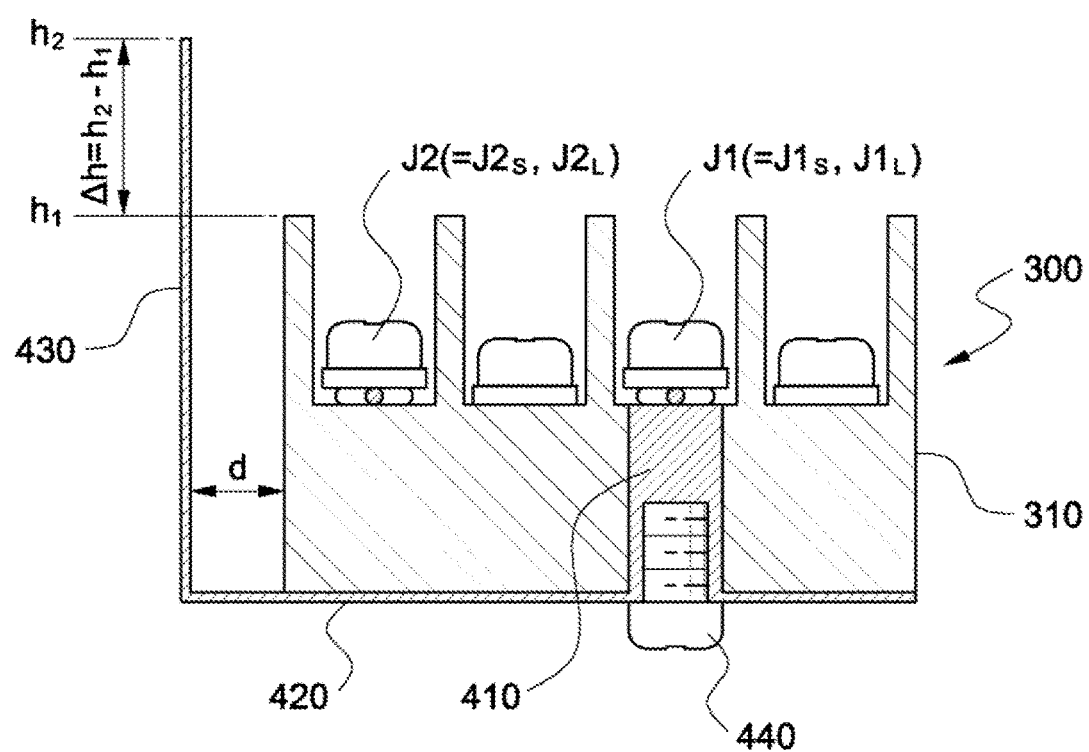
FIG. 4 is a cross-sectional view along the line A-A of FIG. 3.

First, according to an embodiment shown in FIGS. 3 and 4, it is an example in which the leakage-preventing conductor (400) is disposed so as to face a side surface of the terminal block (300). More specifically, the terminal block (300) includes a body portion (310) made of insulator on a top surface of which at least two or more rows of grooves (320, 322) are provided in parallel with dividing walls (325) in between, a first connection terminal (J1) disposed in a first groove (320) and connected to a neutral point terminal (N) of a AC outlet (90), and a second connection terminal (J2) disposed in a second groove (322) and connected to the phase voltage terminal (R) of the AC outlet (90). The first connection terminal (J1) includes a terminal (J1(S)) connected to the power source side, that is, to an first output terminal (OUT1) of the terminal polarity fixing portion (200) and a terminal (J1(L)) connected to the load side. The second connection terminal (J2) also includes two terminals (J2(S), J2(L)) connected to the power source and the load, respectively. Of course, the power source side terminal (J1(S) or J2(S)) and the load side terminal (J1(L) or J2(L)) disposed in a same groove are connected to each other.

The leakage-preventing conductor (400), as shown in the cross-sectional view of FIG. 4, includes a vertical conductor portion (410) penetrating the body portion (310) downward at the first connection terminal (J1), a floor conductor portion (420) bent horizontally at an end of the vertical conductor portion (410) and crosses the bottom of the body portion (310) and extending outward, a planar side conductor portion (430) bent upward at an end of the floor conductor portion (420) and extending to a height where the second connection terminal (J2) is seen and disposed so as to face a side surface of the body portion (310). The leakage-preventing conductor (400) is fixed to the body portion (310) using a bolt (440). The side conductor portion (430) may be located just away from a side surface of the body portion (310). However, the height ($h_2$) of top end of the side conductor portion (430) is preferably higher by at least 5 mm than a height ($h_1$) of top end of the terminal block (300). Various tests showed that when such a height difference Δh is guaranteed, the effects of preventing electrical leakage and shock of the leakage-preventing conductor (400) could be obtained for sure. Since the higher the height of the side conductor portion (430) is, the better the effects of preventing electrical leakage and shock is, in a real application, the height may be adjusted properly considering the size of allowed space for installing.

Also, the side conductor portion (430) should not touch a side surface of the terminal block (300), but it is OK if just separated. However, if separated too much, the resistance between the side conductor portion (430) and the second connection terminal (J2) becomes too large, such that all the current from the second connection terminal (J2) cannot enter the side conductor portion (430) and the amount of leaking current gets large. According to a test which tested the degree of current leakage as increasing an interval, d, from a side surface of the terminal block (300) to the side conductor portion (430), under a condition that the vertical conductor portion (410) is located within 15 mm from the second connection terminal (J2), even though the side conductor portion (430) is separated from the second connection terminal (J2) by up to 300 mm, the current flows only through a region (of water) between the second connection terminal (J2) and the side conductor portion (430) but almost no current leaks elsewhere, such that any electrical shock was not felt when putting a hand into the water in regions other than the above region and the leakage breaker did not operate. However, if the distance between the side conductor portion (430) and the second connection terminal (J2) is greater than 300 mm, the amount of current leaking elsewhere other than the region between them increases, such that the electrical shock was felt at a hand put in the water away from the above region and the leakage breaker operated, disconnecting the power supply to the load connected to the connection terminals (J1, J2).

Unlike the above, if the floor conductor portion (420) are separated from the second connection terminal (J2) by 15 mm or longer, it was found that the distance of the side conductor portion (430) from the J2 is limited much, and the side conductor portion (430) must be separated from the second connection terminal (J2) within 15 mm or shorter, so as to prevent the electrical leakage and shock.

The above real tests confirmed that when the leakage-preventing conductor (400) is disposed at a bottom and a side of the second connection terminal (J2), in order to prevent the electrical leakage and shock, at least one of the bottom portion (that is, floor conductor portion (420)) and the side portion (that is, side conductor portion (430)) of the leakage-preventing conductor (400) needs to be disposed within 15 mm from the second connection terminal (J2). If this condition is satisfied, a remaining one may be separated from the second connection terminal (J2) by up to 300 mm.

The size of the leakage-preventing conductor (400) needs to be determined considering the amount of estimated leaking current. The leaking current coming out from the second connection terminal (J2) and flowing into a top portion of the side conductor portion (430) through water passes through the floor conductor portion (420) and the vertical conductor portion (410) in order and flows to the first connection terminal (J1). If the vertical cross-sectional area, transverse to the leakage current flow, of each conductor portion (430, 420, and 410) of the leakage-preventing conductor (400) is too small for the estimated leaking current, the resistance of conductor is too larger with respect to the leaking current, resulting in an overheating. Thus, water around the flooded conductor portions (430, 420, and 410) may be boiled. According to the tests by the inventor, for example, when the AC voltage is 220 [V] and the terminal block is flooded by tap water, the cross-sectional area (for example, in a case of the side conductor portion (430), this cross-sectional area is the cross-sectional area when seeing the side conductor portion (430) in FIG. 3 from top to the bottom, that is, an area of the rectangle with a narrow width and a long height), with respect to a flowing direction of leakage current, of each conductor portion (430, 420, 410) of the leakage-preventing conductor (400) made of copper preferably may be at least 10 mm$^2$ or larger.

Figure 5:
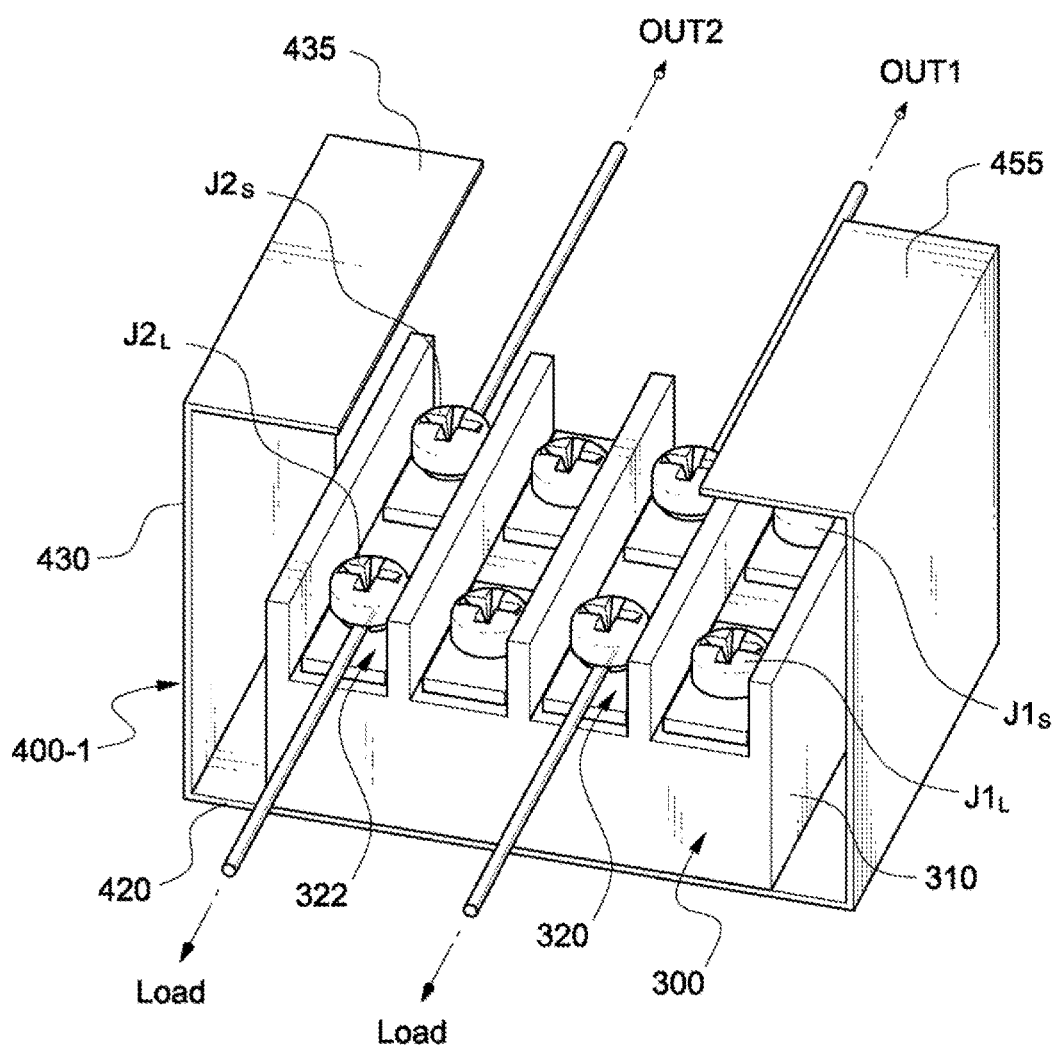
FIG. 5 is a diagram showing a disposition of a terminal block and a leakage-preventing conductor according to another embodiment of the invention.

As shown in FIG. 5, a leakage-preventing conductor (400-1) may further comprise a top conductor portion (435) bent and extending from a top end of the side conductor portion (430) toward a top surface of the body portion (310), in addition to the vertical conductor portion (410), the floor conductor portion (420), and the side conductor portion (430). Furthermore, it may further comprise another side surface conductor portion (450) and another top conductor portion (455) such that connection terminals (J1, J2) may be surrounded by the side conductor portions (430, 450) and the top conductor portion (455) on both left and right side surfaces and on a top. Since the leakage-preventing conductor (400-1) encloses the second connection terminal (J2) by a larger area, more prevention of electrical leakage and shock can be provided than in FIG. 3. This leakage-preventing conductor (400-1) also is electrically connected to the first connection terminal (J1) through the vertical conductor portion (410). A top portion of the body portion (310) is preferable to be vacated between the two top conductor portions (435, 455) to provide a space for wiring work for the connection terminals (J1, J2) as shown in FIG. 5, but if a space for the wiring work is provided by narrowing the width of the two top conductor portions (435, 455), then the two top conductor portions (435, 455) may be connected and cover the top portion of the body portion (310) entirely. Preferably the two top conductor portions (435, 455) may be apart by at least 5 mm or more from a top surface of the terminal block. But, if the two top conductor portions (435, 455) and the second connection terminal (J2) are separated too far, the resistance between them becomes too large and the current from the second connection terminal (J2) leaks more elsewhere rather than to the two top conductor portions (435, 455), such that the function of preventing the electrical leakage and shock would not operate normally.

According to the tests by the inventor, in a case that at least one of the floor conductor portion (420) and the side conductor portion (430) of the leakage-preventing conductor (400-1) is disposed within 15 mm from the second connection terminal (J2), until the interval between the two top conductor portions (435, 455) and the top surface of the terminal block is up to 300 mm, the current flows only in the region between the leakage-preventing conductor (400-1) and the second connection terminal (J2) and almost no current leaks elsewhere, and therefore any electrical shock could not be felt in other regions. However, if the interval exceeds 300 mm, the leaking took place, such that the electrical shock could be felt in the other regions and the leakage breaker operated and stopped the power supply to the load. If both of the floor conductor portion (420) and the side conductor portion (430) of the leakage-preventing conductor (400-1) are separated from the second connection terminal (J2) by over 15 mm, in order to avoid electrical leakage and shock, the two top conductor portions (435, 455) must be disposed within 15 mm from the second connection terminal (J2).

Therefore, the leakage-preventing conductor, when including at least two out of a first portion disposed below the second connection terminal (J2), a second portion disposed by a side of J2, and a third portion disposed above J2, can prevent the electrical leakage and shock when at least one of the at least two portions is disposed within 15 mm from the second connection terminal (J2) and the other is disposed within 30 mm.

The side conductor portion (430) of the leakage-preventing conductor (400) does not have to be perpendicular to the floor conductor portion (420). As the leakage-preventing conductor (400-2) shown in FIG. 6, a side conductor portion (430-1) may be bent by an acute or obtuse angle with respect to the floor conductor portion (420). However, the topmost end of the side conductor portion (430-1) is preferably of a height that is not lower than the second connection terminal (J2), and more preferably extends to a height that is at least 5 mm higher than the second connection terminal (J2).

Figure 6:
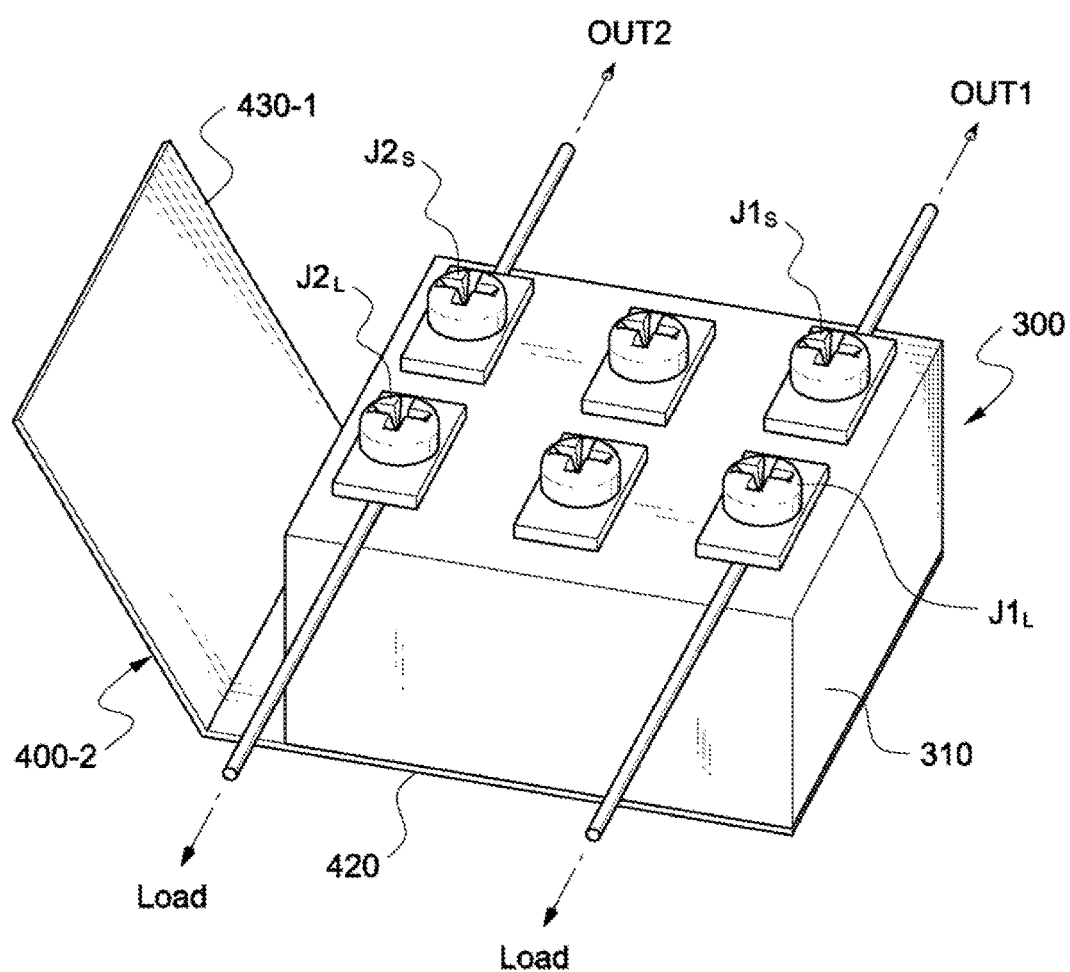
FIG. 6 is a diagram showing a disposition of a terminal block and a leakage-preventing conductor according to still another embodiment of the invention.

The connection terminals (J1, J2), as shown in FIG. 6, may be disposed on a groove-less top surface of the body portion (310) of the terminal block (300).

Figure 7:
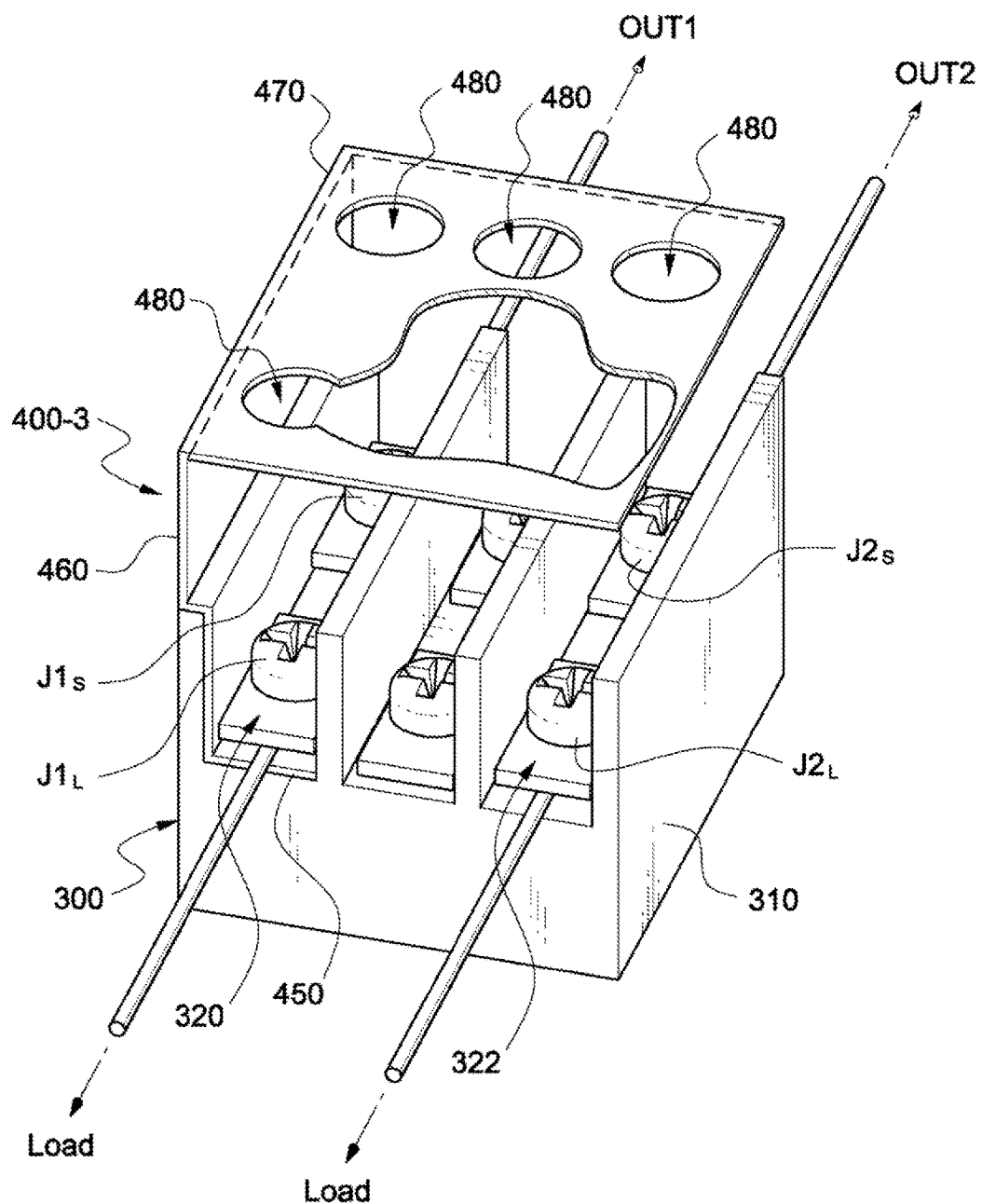
FIG. 7 is a diagram showing a disposition of a terminal block and a leakage-preventing conductor according to still another embodiment of the invention.

FIG. 7 shows another example of the leakage-preventing conductor. A leakage-preventing conductor (400-3) is of a shape that is disposed at a top portion of the terminal block (300). That is, the leakage-preventing conductor (400-3) may be of a form that includes a vertical conductor portion (460) which is electrically connected to the first connection terminal (J1) disposed at a top surface of the terminal block (300) and extends upward by a given length. Furthermore, as shown, the leakage-preventing conductor (400-3) may further include a horizontal conductor portion (470) which is bent at a top end of the vertical conductor portion (460), covers a top surface of the terminal block (300), and extends up to at least near the second connection terminal (J2). Compared with a case of having the vertical conductor portion (460) only, surely it provides better preventing of electrical leakage and shock to include the horizontal conductor portion (470) further. The horizontal conductor portion (470) is preferably disposed with an interval of at least 5 mm from a top surface of the terminal block, that is, the second connection terminal (J2). Also, in order to enable the wiring work to the connection terminals (J1, J2), the horizontal conductor portion (470) is formed with a plurality of screw-assembling holes (480) right above the connection terminals (J1, J2).

On the other hand, in the above various embodiments, the leakage-preventing conductor (400) can be located just within a range of distance from the second connection terminal (J2) mentioned in the above, and there is no limitation on its shape. The larger area of leakage-preventing conductor (400) is disposed around the second connection terminal (J2), the bigger the effects preventing leaking current. For example, the floor conductor portion (420) and the side conductor portion (430) have a shape of extending in a single prong from the vertical conductor portion (410), but it is not limited so, and the side conductor portion may be made of a form of a plurality of prongs (for example, a shape of cross, etc.) divided and extending from the vertical conductor portion (410) in a plurality of directions.

Also, the leakage-preventing conductor may be formed in a structure of closed ring in which the two top conductor portions (435, 455) of FIG. 5 are connected, and a bottom conductor portion, a side conductor portion, and a top conductor portion enclose the second connection terminal (J2) and circumnavigate the terminal block. Furthermore, the leakage-preventing conductor can be formed in a container style, which is like cylinder or square pipe with an opened top, receives the terminal block inside, and encloses the side surface completely.

Furthermore, the leakage-preventing conductors (400-1, 400-2, and 400-3) can be made in a form that a planar conductor disposed at a side or top of the terminal block (300) has a plurality of through-holes bored there through. Even though he does not know why, the inventor could find that if the through-holes are formed through the planar conductor enclosing the terminal block then the effects of decreasing leaking current gets better.

The operation of the electrical leakage-preventing device (100) having the above structure is described below when the connection terminals (J1, J2) are flooded.

As described in the above referring to FIG. 2, by the operation of the terminal polarity fixing portion (200), regardless of in which way the input terminal portion (240) provided with the input terminals (IN1, IN2, G) is plugged into the AC outlet (90), always, a connection of 'neutral point (N) of AC power source—neutral point terminal (N) of AC outlet (90)—first input terminal (IN1)—first output terminal (OUT1)—first connection terminal (J1)' and a connection of 'phase voltage point (R) of AC power source—phase voltage terminal (R) of AC outlet (90)—second input terminal (IN2)—second output terminal (OUT2)—second connection terminal (J2)' are obtained. With such connections, let's suppose that the connection terminals (J1, J2) are flooded while an AC power source is supplied to the load.

Since pure water does not include ion, it is an excellent insulator. However, as the density of impurities that provides ions goes up in the water, the current flows more easily in the water. The electric conductivity of water is 0.055 μs/cm for pure water, 50 μs/cm for clean tap water, 1055 μs/cm for regular tap water (maximum), and 53 μs/cm for sea water. Here, the unit represents the reciprocal of resistance, mho, but the unit S (Siemens) is used internationally. Conventionally, when an electrical device is flooded, the water is not pure, but may be seen to include same or slightly more impurities (ions) than the tap water. Since the water in flooding has an electric conductivity of clean tap water or regular drinking water or a little bit higher than that, let's suppose so.

Before flooding, since the first connection terminal (J1) and the second connection terminal (J2) are in an insulated state from each other, any current does not flow also between the leakage-preventing conductor (400) connected to the first connection terminal (J1) and the second connection terminal (J2). However, if the connection terminals (J1, J2) and the leakage-preventing conductor (400) are flooded, the water between the second connection terminal (J2) connected to the phase voltage terminal (R) of the AC power source and the leakage-preventing conductor (400) connected to the neutral point (N)—first connection terminal (J1) can be a path of current flow. During the flooding, for example, the current comes out from the second connection terminal (J2) and flows through the water. The leakage-preventing conductor (400) has an electric conductivity much higher than the flooding water, and the electrical current has a property of flowing through a path of low resistance. Therefore, most of the current from the second connection terminal (J2) flows into the leakage-preventing conductor (400) that is nearby the second connection terminal (J2), and extremely ignorable amount of current may leak elsewhere. Also the current flowing into the leakage-preventing conductor (400) comes back to the first connection terminal (J1). As a result, only when a human body part is put in an almost linear path region connecting the second connection terminal (J2) and the leakage-preventing conductor (400), an electrical shock may be felt slightly, and even in the flooded water, if getting off from the linear path region, the electrical shock may be felt ignorable. Since the amount of current that flows elsewhere, that is, leaking current is extremely ignorable, the leakage breaker does not operate. Also, in such a condition, the water between the second connection terminal (J2) and the leakage-preventing conductor (400)—first connection terminal (J1) works as a resistor (load) which forms a parallel connection with the real load, such that a normal voltage is kept to be supplied to the real load even in flooding and the load can operate normally like a non-flooding state.

Even though in the above the preferable embodiments have been described in detail, one of ordinary knowledge and skills in the art may be able to modify or change designs of the present invention without leaving the scope of the claims.

The invention claimed is:

1. An electrical leakage prevention device in flooding comprising:
   an input terminal portion including a first input terminal, a second input terminal, and an earth terminal;
   an output terminal portion including a first output terminal and a second output terminal;
   a terminal polarity fixing portion disposed between the input terminal portion and the output terminal portion, wherein, in connecting the first and second input terminals to a phase voltage terminal and a neutral point terminal of an electrical outlet for an AC power source, irrespective of cases that (i) the first input terminal and the phase voltage terminal are connected to each other, and at the same time the second input terminal and the neutral point terminal are connected to each other, or (ii) on the contrary the first input terminal and the neutral point terminal are connected to each other, and at the same time the second input terminal and the phase voltage terminal are connected to each other, the terminal polarity fixing portion always makes electrical connections that the first output terminal is connected electrically to the neutral point terminal and at the same time the second output terminal is connected electrically to the phase voltage terminal;

a terminal block including a body portion made of insulator and a first connection terminal and a second connection terminal, exposed on the body portion and disposed with an interval to be electrically insulated with each other, and for electrically connecting the first output terminal and the second output terminal to a load respectively; and a leakage-preventing conductor connected electrically to the first connection terminal connected electrically to the neutral point terminal but disconnected electrically to the second connection terminal connected electrically to the phase voltage terminal, and disposed around the second connection terminal so as to enclose at least one of at least a portion of a side of the terminal block, at least a portion of a top of the terminal block, and at least a portion of each of the side and the top of the terminal block respectively, wherein, by the leakage-preventing conductor, when the terminal block is flooded, most of current from the second connection terminal flows through water and into the leakage-preventing conductor, and thus any current large enough to cause an electrical shock does not flow through other portions in water, preventing electrical leakage and shock.

2. The electrical leakage prevention device according to claim 1, wherein the terminal polarity fixing portion comprises:

a switching controlling portion for outputting a first control signal while the first input terminal and the second input terminal are connected to the phase voltage terminal and the neutral point terminal of the electrical outlet for the AC power source respectively, and outputting a second control signal while the first input terminal and the second input terminal are connected to the neutral point terminal and the phase voltage terminal of the electrical outlet for the AC power source respectively; and a switching portion for switching such that, if the second control signal is inputted, the first output terminal and the first input terminal are connected to each other and at the same time the second output terminal and the second input terminal are connected to each other, while if the first control signal is inputted, the first output terminal and the second input terminal are connected to each other and at the same time the second output terminal and the first input terminal are connected to each other.

3. The electrical leakage prevention device according to claim 2, wherein the switching portion comprises:

a relay coil configured to be in an excited state when a current flows there through and in a non-excited state when no current flows; and a relay switching terminal configured to switch so as to connect, in the non-excited state, the first output terminal to the first input terminal and at the same time the second output terminal to the second input terminal, and in the excited state, the first output terminal to the second input terminal and at the same time the second output terminal to the first input terminal, wherein the switching controlling portion comprises a relay controlling portion that makes the excited state by making a current flow through the relay coil while the first input terminal and the second input terminal are connected to the phase voltage terminal and the neutral point terminal of the electrical outlet for AC power source, and makes the non-excited state by making no current flow through the relay coil while the first input terminal and the second input terminal are connected to the neutral point terminal and the phase voltage terminal, respectively.

4. The electrical leakage prevention device according to claim 3, wherein the relay controlling portion comprises:

a voltage comparing circuit for comparing a voltage at the first input terminal with a voltage at an earth terminal, outputting a logic-high voltage to an output end only while the voltage at the first input terminal is higher than the voltage at an earth terminal, and outputting a logic-low voltage otherwise; and a switching circuit for being closed so as to make current flow through the relay coil only if the logic-high voltage is outputted to the output end of the voltage comparing circuit.

5. The electrical leakage prevention device according to claim 2, wherein the terminal polarity fixing portion further comprises an SMPS for converting an AC voltage inputted through the first input terminal and the second input terminal to a DC voltage needed for an operation of the switching controlling portion.

6. The electrical leakage prevention device according to claim 1, wherein the leakage-preventing conductor comprises:

a vertical conducting portion penetrating the body portion downward from the first connection terminal;

a floor conducting portion which is bent horizontally at an end of the vertical conducting portion, crosses a bottom of the body portion, and extends to an outside of the bottom; and a side conducting portion which is bent upward at an end of the floor conducting portion, faces a side surface of the body portion, and extends to a height that is not lower than a top surface of the terminal block.

7. The electrical leakage prevention device according to claim 6, wherein the floor conducting portion and the side conducting portion are formed to include a plurality of prongs that are divided into a plurality of different directions with respect to the vertical conducting portion.

8. The electrical leakage prevention device according to claim 6, wherein a height of the side conducting portion is higher than a height of the terminal block by at least 5 mm.

9. The electrical leakage prevention device according to claim 6, wherein the leakage-preventing conductor further comprises a top conducting portion which is bent toward a top surface of the terminal block at a top end of the side conducting portion and covers at least a portion of the top surface of the terminal block.

10. The electrical leakage prevention device according to claim 1, wherein the input terminal portion is formed as a plug type which can be inserted into the electrical outlet for the AC power source to be supplied with an AC power only when necessary.

11. The electrical leakage prevention device according to claim 1, wherein the leakage-preventing conductor has (i) a structure of container that receives the terminal block inside and encloses side surfaces completely, or (ii) a structure of a closed ring that encloses the second connection terminal and circumnavigates around the terminal block.

12. The electrical leakage prevention device according to claim 1, wherein the leakage-preventing conductor comprises a top vertical conducting portion which is bent at the first connection terminal and extended upward over a top of the body portion.

13. The electrical leakage prevention device according to claim 12, wherein the leakage-preventing conductor further comprises a top horizontal conducting portion which is bent at a top end of the top vertical conducting portion and extended to cover the second connection terminal.

14. The electrical leakage prevention device according to claim 1, wherein the leakage-preventing conductor has a vertical cross-sectional area equal to or larger than 10 mm$^2$ with respect to a direction of current flow.

15. The electrical leakage prevention device according to claim 1, wherein the leakage-preventing conductor includes at least two portions out of a first portion disposed under the second connection terminal, a second portion disposed at a side of the second connection terminal, and a third portion disposed on a top of the second connection terminal, and wherein at least one out of the at least two portions is located within 15 mm and the other portion is located within 30 mm, respectively, from the second connection terminal.

16. The electrical leakage prevention device according to claim 1, wherein the leakage-preventing conductor includes a planar conductor portion formed with a plurality of through-holes, which is located by a side of or over a top of the terminal block.

* * * * *